(12) United States Patent
Shinano et al.

(10) Patent No.: US 10,514,525 B2
(45) Date of Patent: Dec. 24, 2019

(54) LENS BARREL AND CAMERA PROVIDED WITH SAME

(71) Applicant: Panasonic Intellectual Property Management Co., Ltd., Osaka (JP)

(72) Inventors: Fumio Shinano, Osaka (JP); Tetsuya Morita, Osaka (JP)

(73) Assignee: Panasonic Intellectual Property Management Co., Ltd, Osaka (JP)

( * ) Notice: Subject to any disclaimer, the term of this patent is extended or adjusted under 35 U.S.C. 154(b) by 46 days.

(21) Appl. No.: 15/391,044

(22) Filed: Dec. 27, 2016

(65) Prior Publication Data

US 2017/0184810 A1 Jun. 29, 2017

(30) Foreign Application Priority Data

Dec. 28, 2015 (JP) ................................. 2015-256483
Nov. 1, 2016 (JP) ................................. 2016-213982

(51) Int. Cl.
*G02B 7/10* (2006.01)
*G02B 7/02* (2006.01)
*G02B 27/00* (2006.01)
*H04N 5/225* (2006.01)

(52) U.S. Cl.
CPC ............. *G02B 7/10* (2013.01); *G02B 7/021* (2013.01); *G02B 27/0018* (2013.01); *H04N 5/2254* (2013.01)

(58) Field of Classification Search
CPC ..... G03B 11/04; G03B 11/045; G03B 11/048; G03B 11/02; G02B 7/10; G02B 7/021; G02B 7/022; G02B 7/023; G02B 7/026; G02B 27/0018; H04N 5/2254

USPC ............... 359/229, 819, 826, 830, 611, 612; 396/534
See application file for complete search history.

(56) References Cited

U.S. PATENT DOCUMENTS

2003/0128973 A1* 7/2003 Shinohara ................ G02B 7/04
396/25
2013/0170036 A1* 7/2013 Chang ................. G03B 11/041
359/511

FOREIGN PATENT DOCUMENTS

JP 06-082880 A 3/1994

* cited by examiner

*Primary Examiner* — Marin Pichler
(74) *Attorney, Agent, or Firm* — Renner, Otto, Boisselle & Sklar, LLP

(57) ABSTRACT

A lens barrel includes a tip member, a lens hood, and a sliding member. The tip member is disposed on a subject side in an optical axis direction, and includes an optical system. The lens hood moves between a storage position and a use position in the optical axis direction. The sliding member is provided on an inner circumferential surface side of the lens hood. When the lens hood moves from the storage position to the use position, the sliding member moves to the subject side in the optical axis direction in a state where the sliding member is in contact with an outer circumferential surface of the tip member. In a state where the lens hood is located at the storage position, an interval of at least a portion of a clearance formed between the inner circumferential surface of the lens hood and the outer circumferential surface of the tip member is narrowed toward the subject side in the optical axis direction.

16 Claims, 13 Drawing Sheets

Slide hood storage position

Slide hood use position

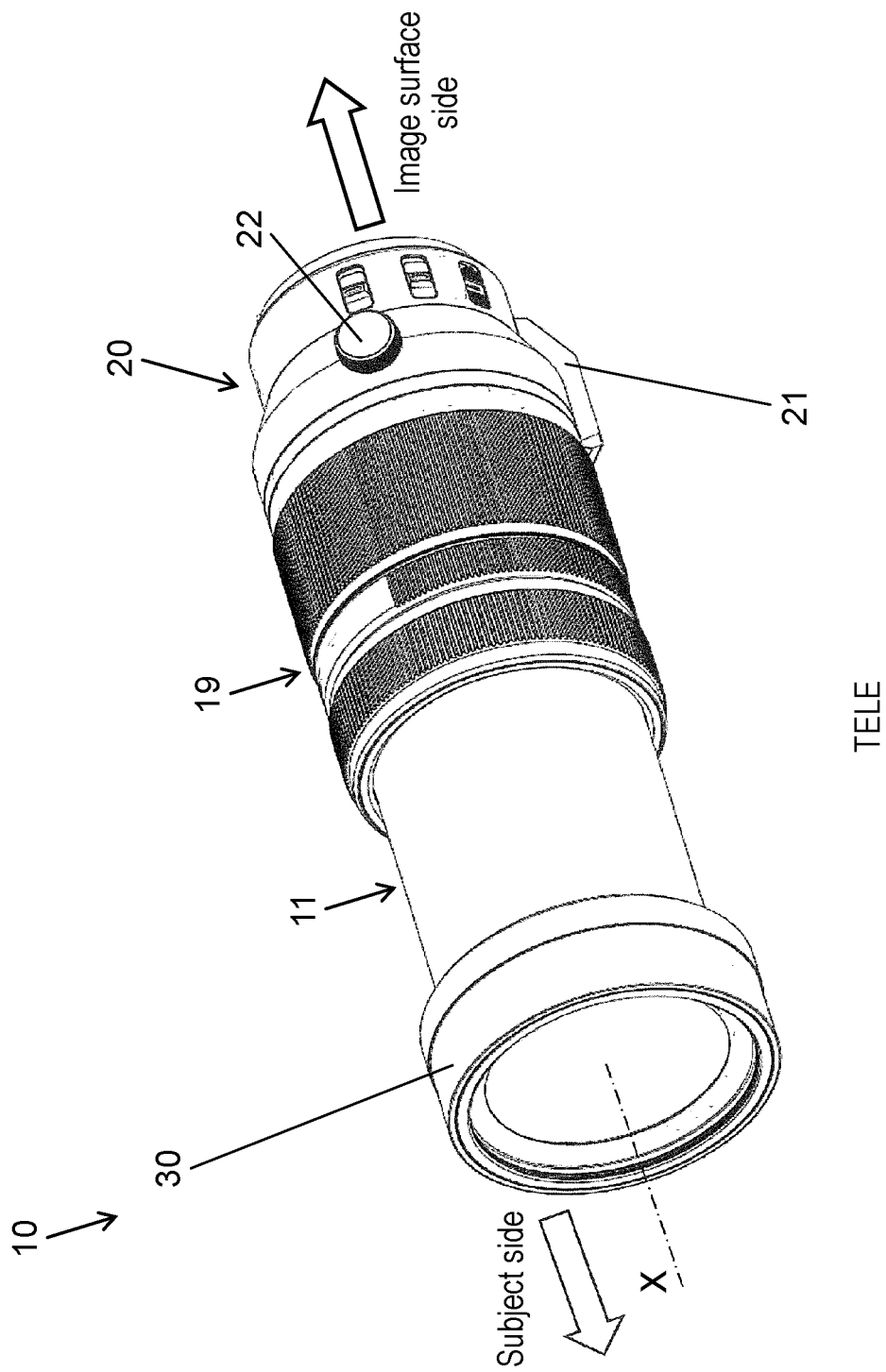

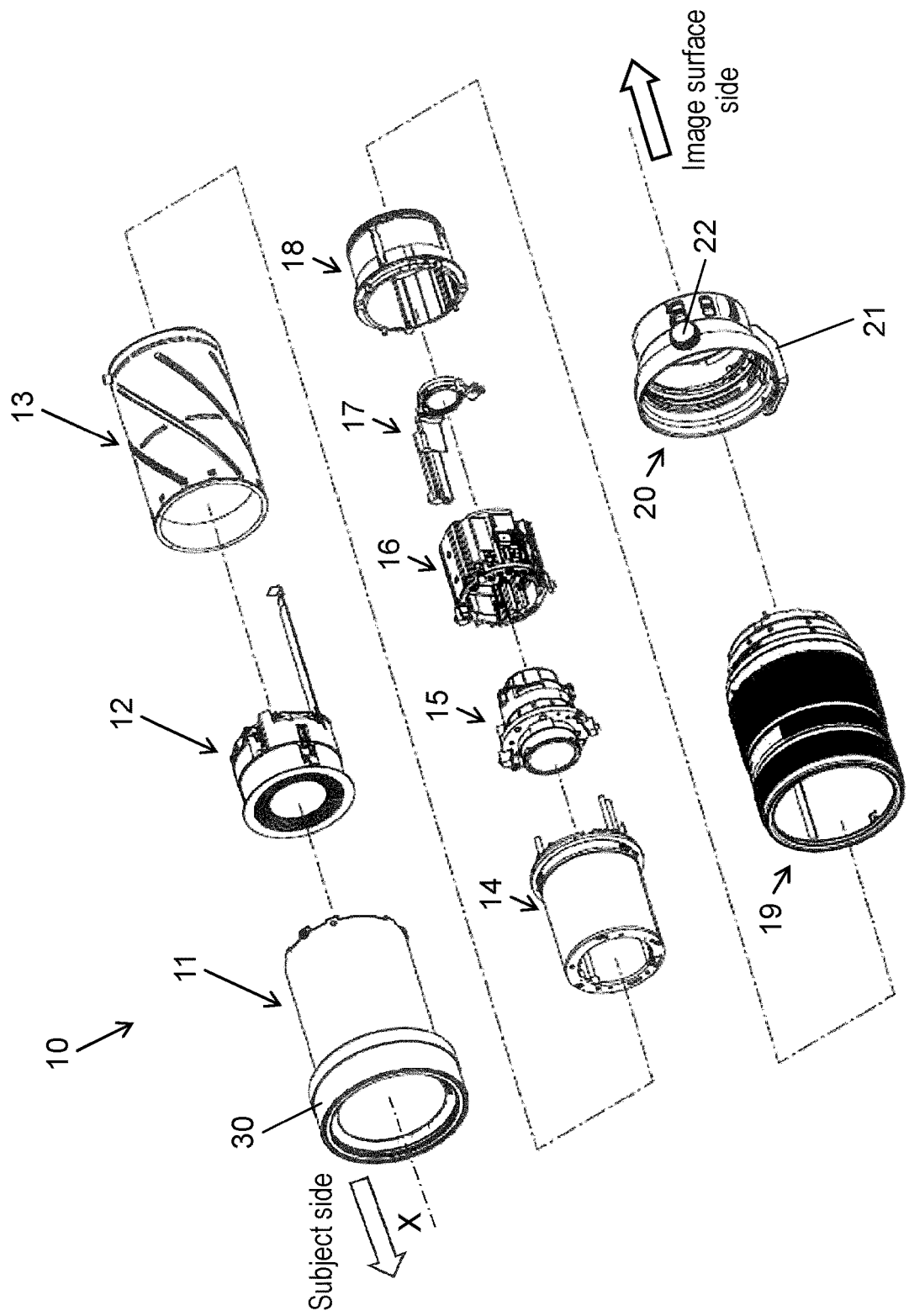

Slide hood (storage position)

Slide hood (use position)

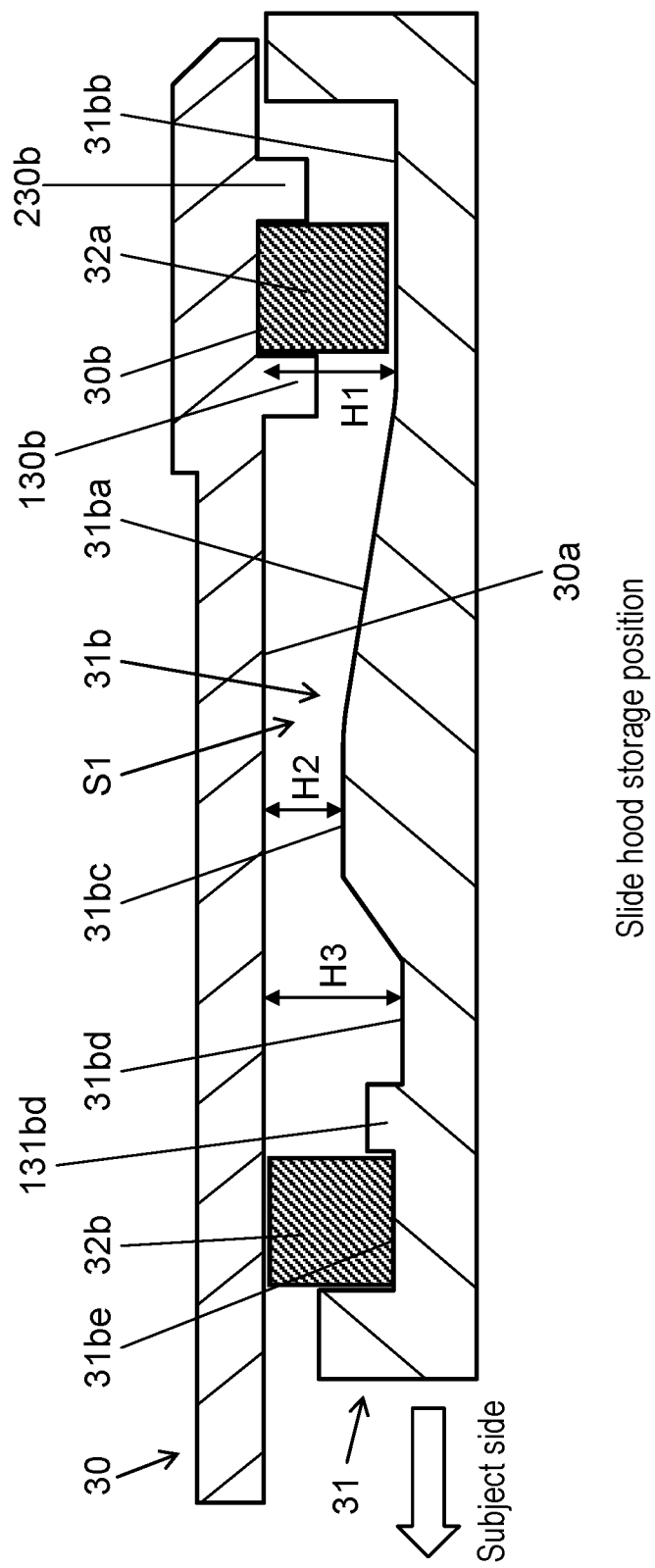

LENS BARREL AND CAMERA PROVIDED WITH SAME

BACKGROUND

1. Technical Field

The present disclosure relates to a lens barrel and a camera provided with the lens barrel.

2. Description of the Related Art

A lens barrel can be attached with a lens hood at a tip of the lens barrel in order to block unnecessary light which causes flare or ghost. Since most of the unnecessary light is blocked by the lens hood, the lens barrel attached with the lens hood can suppress occurrence of the flare or the ghost.

For example, Unexamined Japanese Patent Publication No. H06-82880 discloses a lens hood provided with a hood body and a douser. The hood body is mounted on a hood bayonet member bayonet-coupled to a barrel front frame so as to be rotatable and lockable. The douser is mounted on the hood body in an optical axis direction so as to be slidable and lockable.

When this lens hood moves to a use position, the lens hood is extended to a subject side. Then, an elastic protrusion provided at the douser moves along a guide groove provided at the hood body in the optical axis direction. This guide groove has a portion whose dimension in a width direction (a circumferential direction) is enlarged. The elastic protrusion is fitted into the portion whose groove width is enlarged, thereby holding the lens hood.

SUMMARY

A lens barrel according to the present disclosure includes a tip member, a lens hood, and a sliding member. The tip member is disposed on a subject side in an optical axis direction, and includes an optical system. The lens hood is mounted on the tip member. The lens hood moves in the optical axis direction between a predetermined storage position and a use position protruded to the subject side with respect to the storage position. The sliding member is provided on an inner circumferential surface side of the lens hood. When the lens hood moves from the storage position to the use position, the sliding member moves to the subject side in the optical axis direction in a state where the sliding member is in contact with an outer circumferential surface of the tip member. In a state where the lens hood is located at the storage position, an interval of at least a portion of a clearance formed between the inner circumferential surface of the lens hood and the outer circumferential surface of the tip member is narrowed toward the subject side in the optical axis direction.

A camera of the present disclosure includes the lens barrel of the present disclosure and a camera body to which the lens barrel is attached.

The lens barrel and the camera according to the present disclosure can reduce a load in a strength aspect.

BRIEF DESCRIPTION OF THE DRAWINGS

FIG. 2B is a perspective view showing a state where the optical system of the lens barrel in FIG. 2A is located on a telephoto side (at a TELE position);

FIG. 4 is an exploded perspective view of respective components configuring the lens barrel in FIG. 1;

FIG. 8A is a sectional view schematically showing a position of a sliding member in the state where the lens hood attached to the tip of the lens barrel in FIG. 1 is located at the storage position;

DETAILED DESCRIPTION

Figure 1:
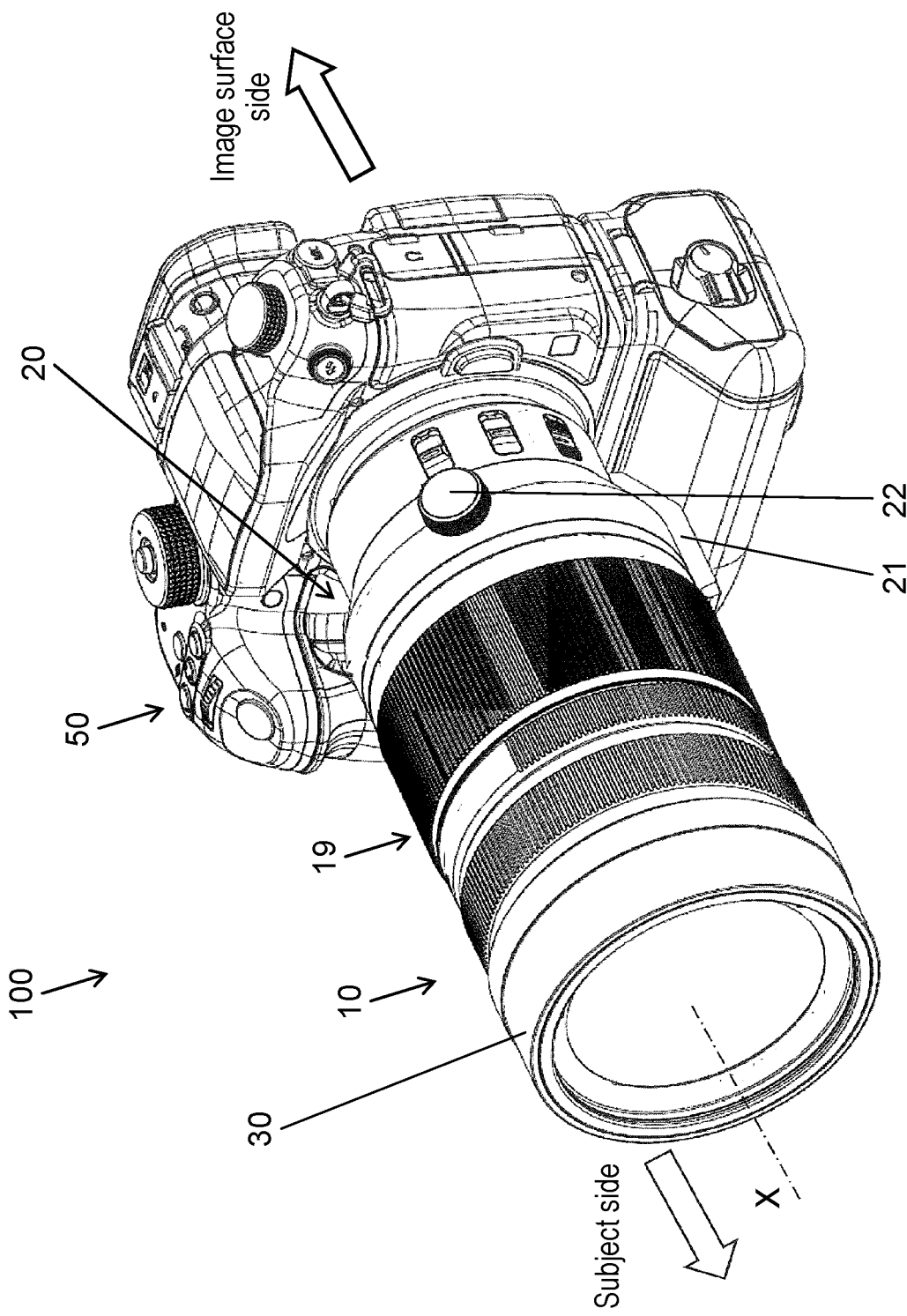
FIG. 1 is an overall perspective view showing a configuration of a camera configured with a camera body and a lens barrel which includes a holding structure of a lens hood according to a first exemplary embodiment of the present disclosure.

Hereinafter, exemplary embodiments will be described in detail while appropriately referring to the drawings. However, unnecessarily detailed description may be omitted. For example, detailed description of a matter that are already known well or overlapping description of substantially the same configuration may be omitted. This is to avoid unnecessary redundancy of the following description and to facilitate understanding of those skilled in the art.

It should be noted that applicants provide the accompanying drawings and the following description to enable those skilled in the art to fully understand the present disclosure, and the applicants do not intend to limit the subject described in the claims by these drawings and description.

First Exemplary Embodiment

A lens barrel and a camera provided with the lens barrel according to one exemplary embodiment of the present disclosure will be described with reference to FIGS. 1 to 8B.

1. Configuration of Camera

As shown in FIG. 1, camera 100 according to the present exemplary embodiment includes camera body 50 and lens barrel 10. Camera body 50 includes an imaging element, a memory, and a controller. The imaging element converts light from lens barrel 10 to an electric signal. The controller controls the imaging element or an optical system included in lens barrel 10. The memory stores the electric signal generated by the imaging element as digital data.

2. Configuration of Lens Barrel

Figure 3A:
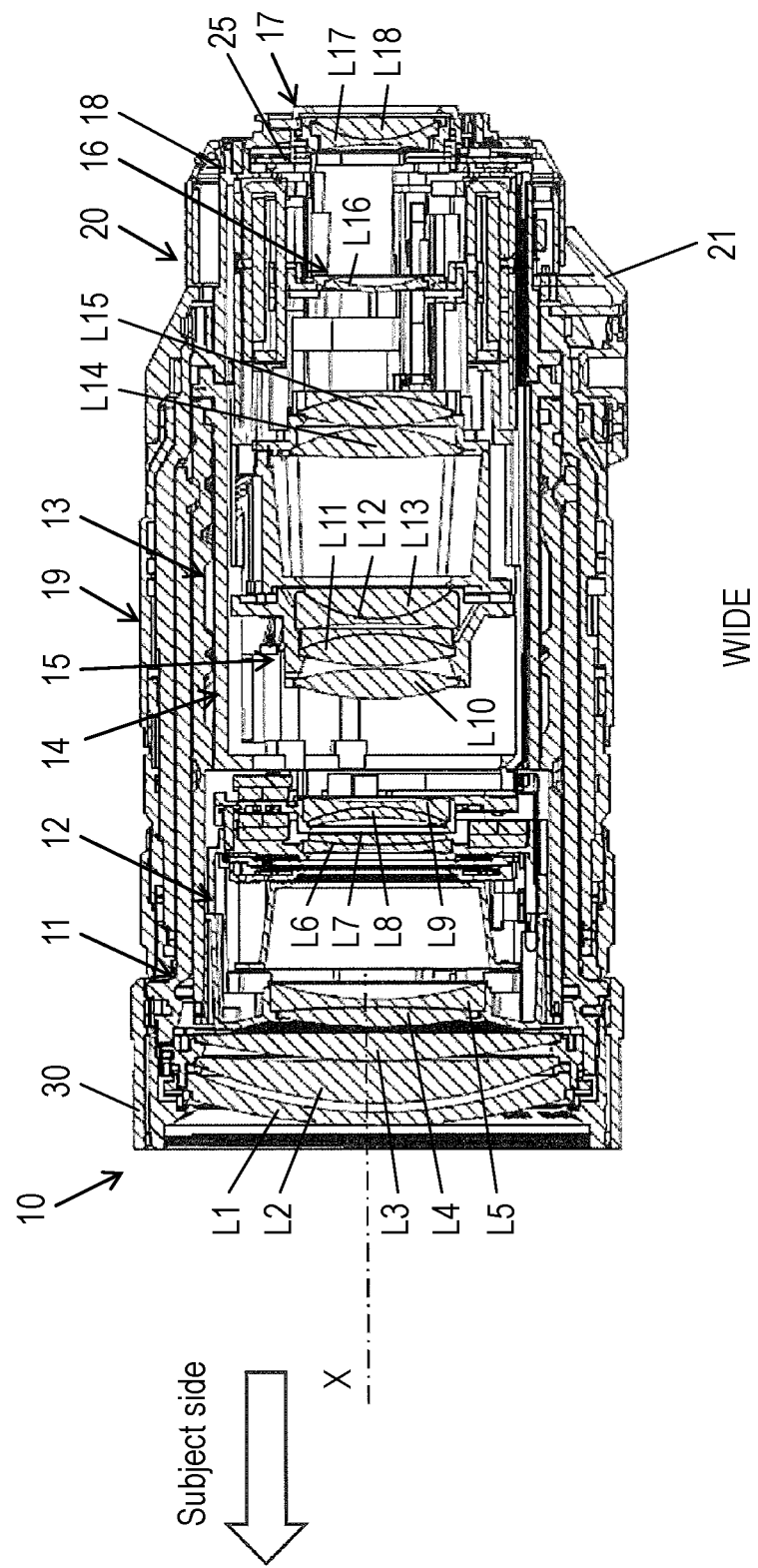
FIG. 3A is a sectional view of the lens barrel in FIG. 2A.
Figure 3B:
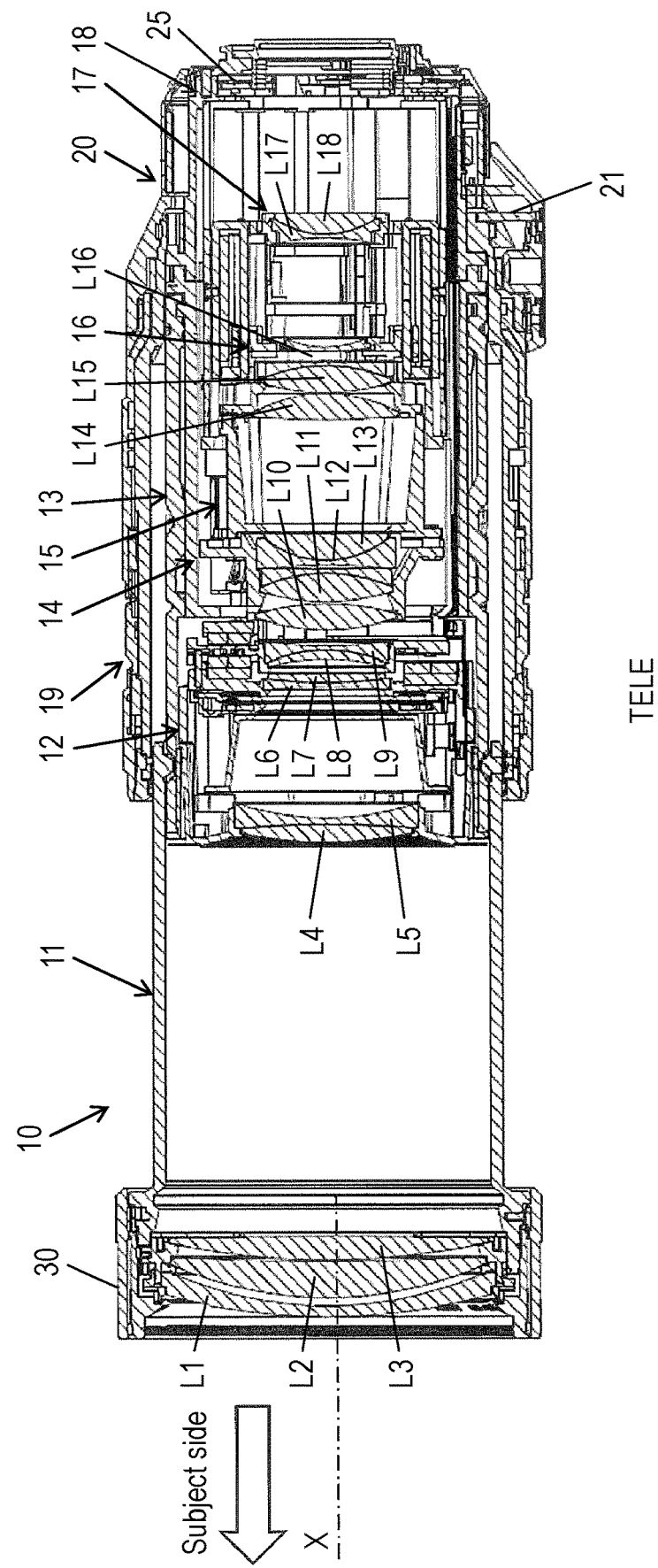
FIG. 3B is a sectional view of the lens barrel in FIG. 2B.
Figure 5:
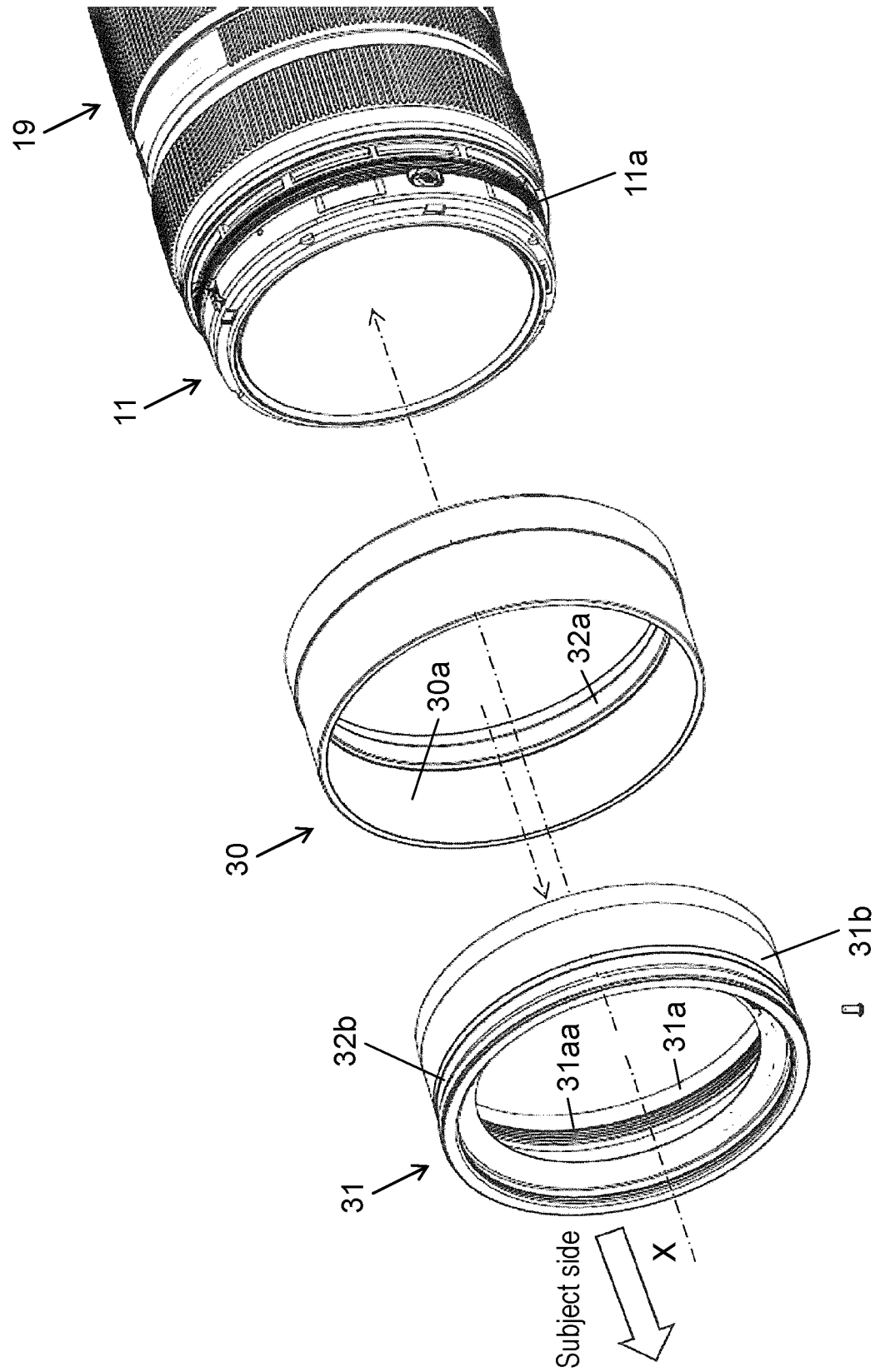
FIG. 5 is an exploded perspective view showing a main part of the lens barrel in FIG. 1.

Lens barrel 10 according to the present exemplary embodiment has an optical system including lenses L1 to L18 shown in FIGS. 3A and 3B, lens hood 30, filtering 31, sliding member 32a, and sliding member 32b shown in FIG. 5. As shown in FIG. 1, lens barrel 10 is attached to a mount of camera body 50.

Here, an X axis direction shown in FIG. 1 is an optical axis direction of the optical system of lens barrel 10. Hereinafter, a subject side in the optical axis direction means an opposite side to an image surface side of camera body 50. The image surface side is a side on which the imaging element is disposed. Hereinafter, the optical axis direction of the optical system of lens barrel 10 is referred to as an optical axis X direction.

Figure 2A:
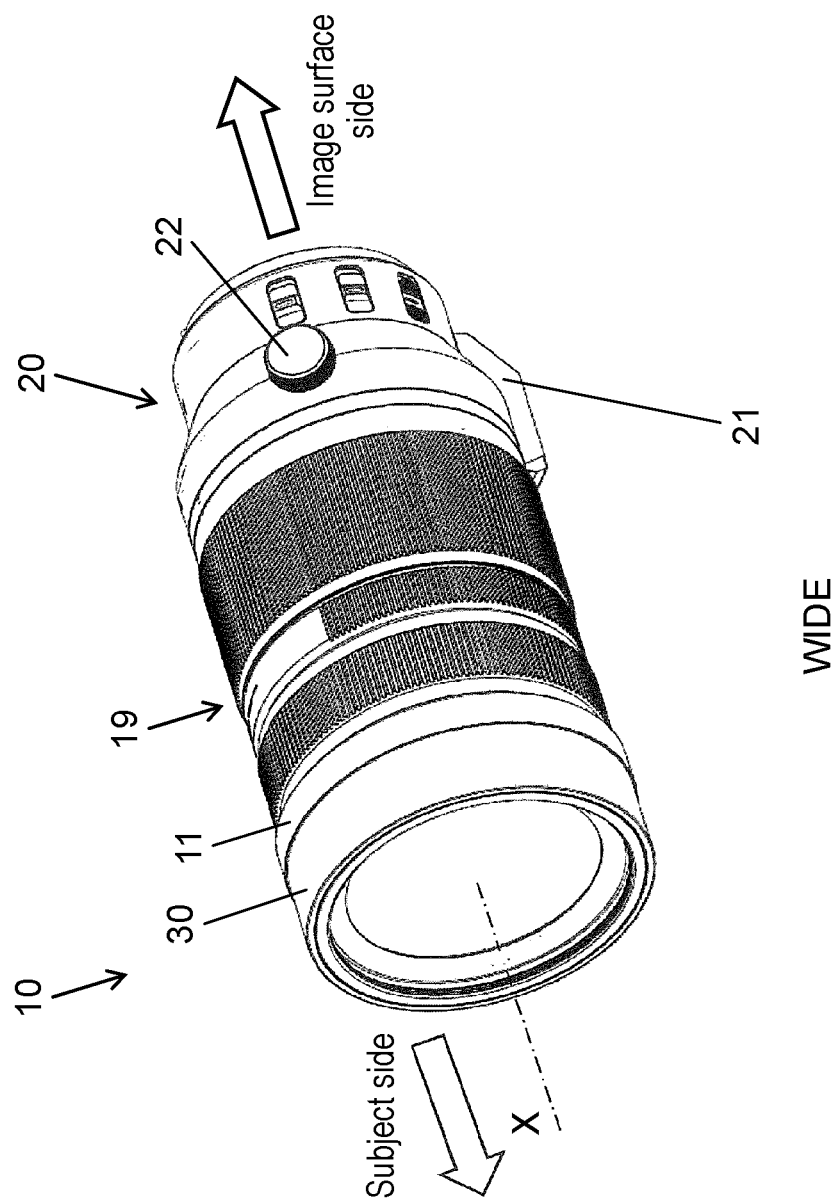
FIG. 2A is a perspective view showing a state where an optical system of the lens barrel in FIG. 1 is located on a wide-angle side (at a WIDE position)

In lens barrel 10, as shown in FIGS. 2A and 2B, the built-in optical system moves between a wide-angle side (a WIDE position) and a telephoto side (a TELE position) in the optical axis X direction. With this configuration, variable magnification photographing can be performed.

In a state where lens barrel 10 is located at the WIDE position shown in FIG. 2A, one-group unit 11 of the optical system, which will be described below, is stored on an inner circumferential surface side of exterior unit 19, as shown in FIG. 3A.

On the other hand, in a state where lens barrel 10 is located at the TELE position shown in FIG. 2B, one-group unit 11 moves to the subject side along the optical axis X direction and is protruded from exterior unit 19 closer to the subject, as shown in FIG. 3B.

2-1. Configuration of Optical System

As shown in FIG. 4, the optical system of lens barrel 10 is configured with one-group unit 11, two-group unit 12, cam frame 13, fixed frame 14, three-group unit 15, four-group unit 16, five-group unit 17, mount base 18, exterior unit 19, rear frame 20, and the like.

One-group unit 11 is a cylindrical member. As shown in FIG. 5, a spiral groove is formed as screw 11a on an outer circumferential surface of one-group unit 11. Also, as shown in FIGS. 3A and 3B, lenses L1 to L3 are disposed on the subject side and inside one-group unit 11. One-group unit 11 moves forward and backward along the optical axis X direction in a state where lenses L1 to L3 are held on the subject side. With this configuration, distances from lenses L1 to L18 are changed, and wide-angle photography and telephotography can be performed.

As shown in FIGS. 3A, 3B, and 4, two-group unit 12 is a cylindrical member disposed on an inner circumferential surface side of one-group unit 11. Two-group unit 12 holds lenses L4 to L9. Lenses L4 to L9 are disposed on the image surface side in the optical axis X direction with respect to lenses L1 to L3.

As shown in FIGS. 3A and 3B, three-group unit 15 holds lenses L10 to L15. Three-group unit 15 is disposed on the image surface side in the optical axis X direction with respect to two-group unit 12. Moreover, as shown in FIG. 4, three-group unit 15 is disposed on an inner circumferential surface side of cylindrical four-group unit 16. Three-group unit 15 is driven by an actuator, thereby moving forward and backward in the optical axis X direction in a state where lenses L10 to L15 are held.

Four-group unit 16 is a substantially cylindrical member. As shown in FIGS. 3A and 3B, four-group unit 16 holds lens L16. Also, as shown in FIG. 4, four-group unit 16 is disposed on a downstream side of three-group unit 15, when viewed from the subject side in the optical axis X direction. Lens L16 is disposed on the image surface side in the optical axis X direction with respect to lenses L10 to L15.

As shown in FIGS. 3A and 3B, five-group unit 17 holds lenses L17 and L18. As shown in FIG. 4, five-group unit 17 is disposed on the inner circumferential surface side of cylindrical four-group unit 16. Lenses L17 and L18 are disposed on the image surface side in the optical axis X direction with respect to Lens L16. Five-group unit 17 is movable in the optical axis X direction. Specifically, five-group unit 17 is driven by the actuator in a state where lenses L17 and L18 are held, thereby moving forward and backward in the optical axis X direction.

As shown in FIG. 4, cam frame 13 is a cylindrical member. Cam frame 13 is provided with a cam groove. Cam frame 13 is disposed on outer circumferential surface sides of two-group unit 12, three-group unit 15, four-group unit 16, and fixed frame 14. Also, a cam pin provided on an outer circumferential surface of four-group unit 16 is fitted into the cam groove of cam frame 13.

The cam pin of four-group unit 16 moves along the cam groove by receiving a rotary drive force imparted from a rotary drive source. With this configuration, one-group unit 11 to five-group unit 17 can be moved forward and backward in the optical axis X direction. Since it is possible to adjust the distances from lenses L1 to L18 included in one-group unit 11 to five-group unit 17, the wide-angle photography, the telephotography, or the like can be performed.

As shown in FIG. 4, fixed frame 14 is a cylindrical member. Fixed frame 14 is disposed on outer circumferential surface sides of three-group unit 15 and four-group unit 16. Fixed frame 14 is disposed on an inner circumferential surface side of cam frame 13.

As shown in FIG. 4, mount base 18 is a substantially cylindrical member serving as a base of lens barrel 10. Four-group unit 16 is fixed to an inner circumferential surface side of mount base 18. Further, mount base 18 is mounted with cam frame 13 in a relatively rotatable state.

As shown in FIGS. 2A and 4, exterior unit (front frame) 19 is a cylindrical member constituting an exterior portion of lens barrel 10. An annular focus ring, an annular zoom ring, and the like are mounted on an outer circumferential surface of exterior unit 19 in a rotatable state.

Rear frame 20 is mounted to an end on the image surface side of exterior unit 19. Rear frame 20 constitutes the exterior portion of lens barrel 10 together with exterior unit 19. Also, rear frame 20 is mounted so as to relatively rotate with respect to mount base 18 and exterior unit 19.

Further, rear frame 20 includes circuit board 25 shown in FIGS. 3A and 3B and a flexible board, a switch, and the like electrically connected to circuit board 25.

As shown in FIGS. 2A and 2B, tripod mount 21 is mounted to an outer circumferential surface of rear frame 20. Tripod mount 21 is a pedestal portion, to which tripods are connected.

Further, as shown in FIGS. 2A and 2B, tripod lock screw 22 is mounted to the outer circumferential surface of rear frame 20. Since rear frame 20 is mounted in a relatively rotatable state with respect to mount base 18 and exterior unit 19, tripod lock screw 22 regulates the relative rotation of rear frame 20 at a predetermined position. Specifically, tripod lock screw 22 regulates the relative rotation of rear frame 20 by imparting pressing force in a direction intersecting with the optical axis X direction.

2-2. Configuration of Filtering

As shown in FIG. 5, filtering 31 is a cylindrical member. An outer diameter of filtering 31 is slightly smaller than an inner diameter of lens hood 30. Further, filtering 31 has inner circumferential surface 31a and outer circumferential surface 31b. A spiral groove is formed as screw 31aa at a position of inner circumferential surface 31a closer to the image surface side in the optical axis X direction. Filtering 31 is provided at a tip of one-group unit 11 on the subject side in the optical axis X direction. More specifically, filtering 31 is held by the tip on the subject side of one-group unit 11 by screwing screw 31aa of filtering 31 and screw 11a of one-group unit 11. For example, filtering 31 is used to protect lens L1 of one-group unit 11. Further, for example, filtering 31 is used as a base for mounting lens hood 30.

Here, filtering 31 and one-group unit 11 constitute a tip member of the present disclosure. Filtering 31 and one-group unit 11 may be configured to be mechanically separable or may be formed integrally. In the present exemplary embodiment, filtering 31 and one-group unit 11 are configured to be mechanically separable.

Figure 8B:
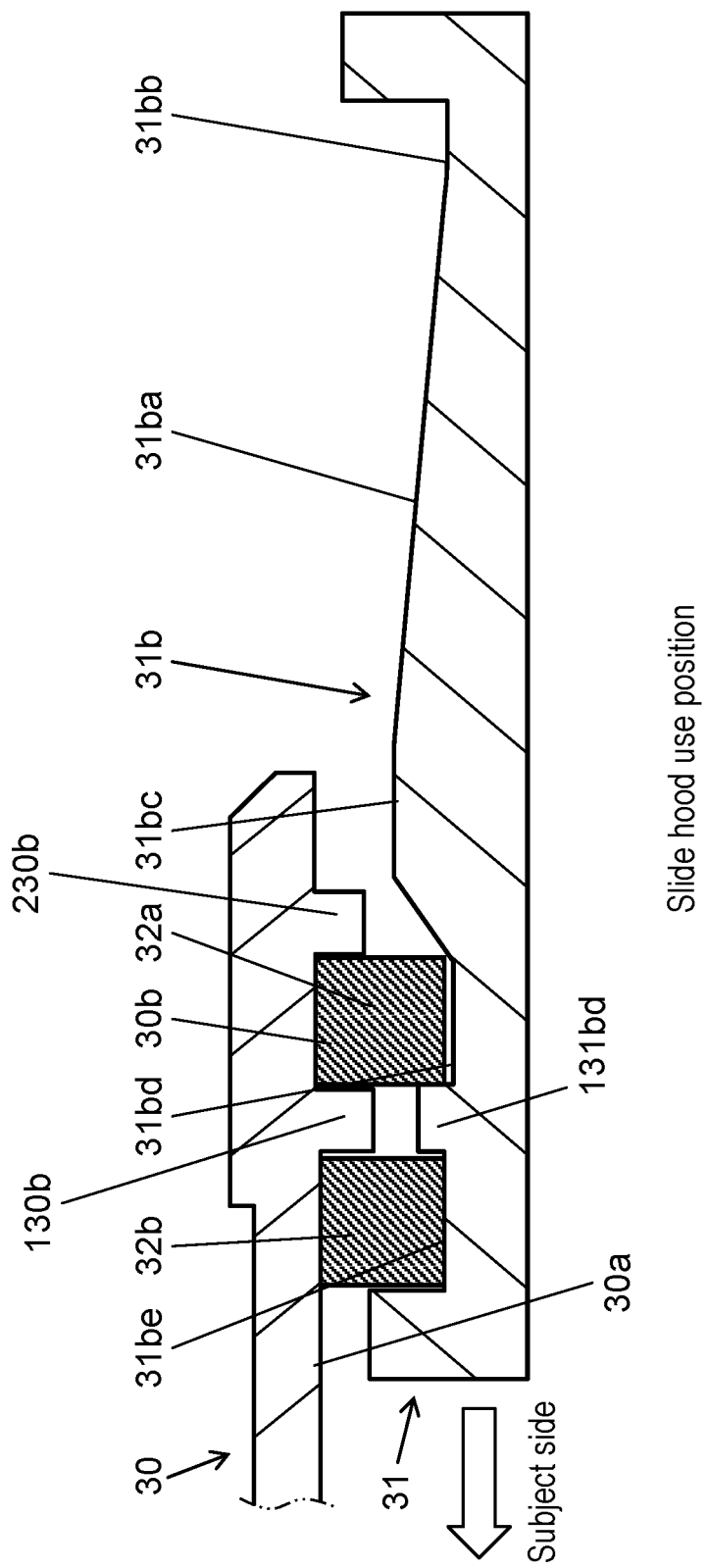
FIG. 8B is a sectional view schematically showing a position of the sliding member in the state where the lens hood attached to the tip of the lens barrel in FIG. 1 is located at the use position.

Moreover, as shown in FIGS. 8A and 8B, outer circumferential surface 31b of filtering 31 has first holding part 31bb, inclined surface 31ba, protrusion surface 31bc, second holding part 31bd (recess), and holding part 31be in this order from the image surface side to the subject side.

First holding part 31bb is a recessed portion in a sectional view. First holding part 31bb is provided at an end of outer circumferential surface 31b of filtering 31 on the image surface side in the optical axis X direction.

Inclined surface 31ba is inclined downward from the subject side to the image surface side in the optical axis X direction.

Protrusion surface 31bc is a cylindrical surface disposed adjacent to the subject side of inclined surface 31ba. Protrusion surface 31bc is provided approximately in a center of filtering 31 in the optical axis X direction.

Second holding part 31bd is a recessed portion in the sectional view. Second holding part 31bd is provided at a position adjacent to the subject side in the optical axis X direction of protrusion surface 31bc. Protrusion 131bd is provided between second holding part 31bd and holding part 31be, which will be described below.

Holding part 31be is a recessed portion in the sectional view. Holding part 31be is provided at an end of outer circumferential surface 31b of filtering 31 on the subject side in the optical axis X direction. Holding part 31be holds sliding member 32b on a surface corresponding to a bottom surface of the recessed portion.

2-3. Configuration of Lens Hood

As shown in FIG. 5, lens hood 30 is a cylindrical member. Lens hood 30 is provided at the tip of one-group unit 11 on the subject side in the optical axis X direction via filtering 31. Lens hood 30 suppresses incidence of unnecessary light during photographing.

Figure 6:
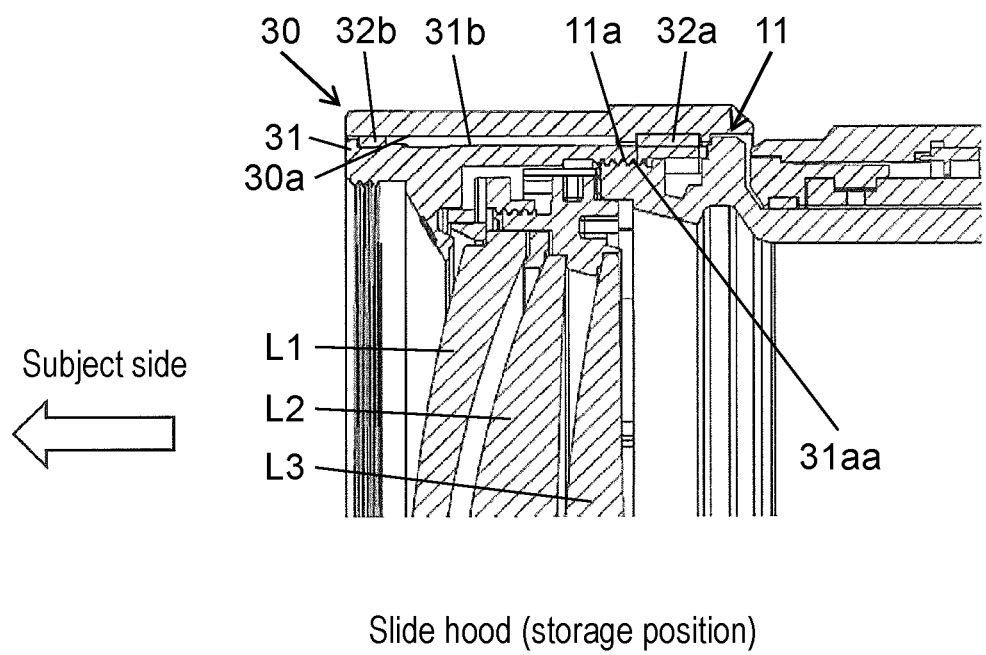
FIG. 6 is a sectional view showing a state where the lens hood attached to a tip of the lens barrel in FIG. 1 is located at a storage position.
Figure 7:
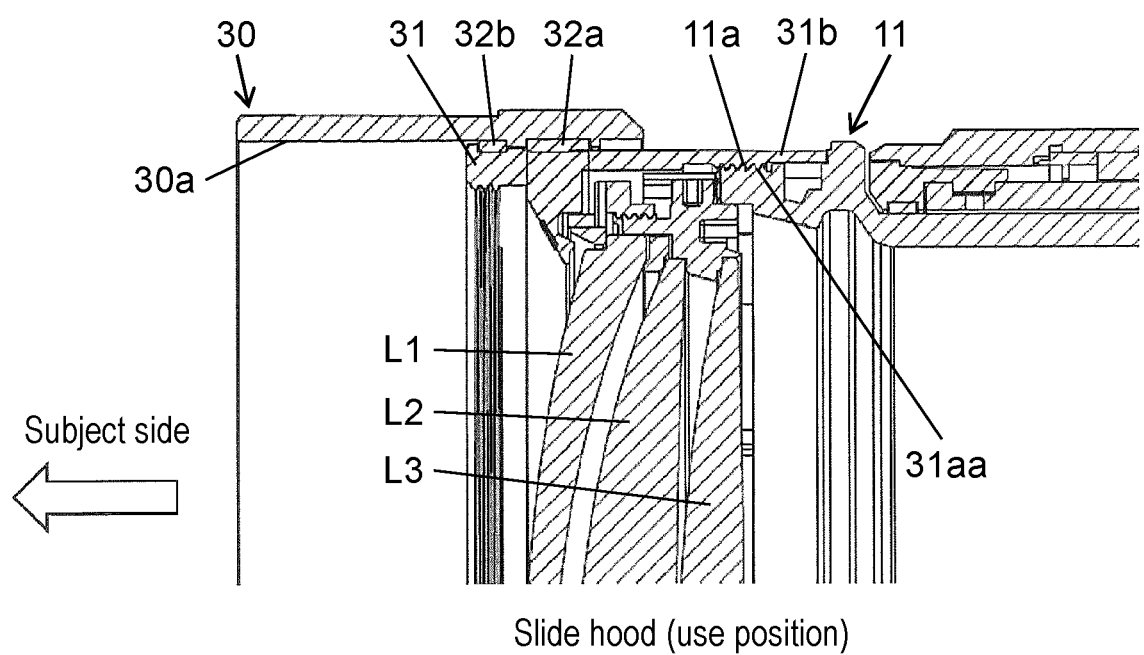
FIG. 7 is a sectional view showing a state where the lens hood attached to the tip of the lens barrel in FIG. 1 is located at a use position.

FIG. 6 shows a state where lens hood 30 is located at a storage position. FIG. 7 shows a state where the lens hood is located at a use position. As shown in FIG. 7, a user can use lens hood 30 by extending lens hood 30 to the subject side along the optical axis X direction. A holding structure of lens hood 30 in lens barrel 10 located at the storage position and the use position will be described below in detail.

As shown in FIGS. 5, 8A, and 8B, an inner surface of lens hood 30 is inner circumferential surface 30a. Moreover, as shown in FIGS. 8A and 8B, holding part 30b is formed at a portion of inner circumferential surface 30a closer to the image surface side in the optical axis X direction. Holding part 30b is formed into a recessed shape. In other words, holding part 30b is a portion between protrusion 130b formed on the subject side and protrusion 230b formed on the image surface side. Sliding member 32a is disposed at holding part 30b.

2-4. Configuration of Sliding Member

As shown in FIGS. 5, 8A, and 8B, sliding member 32a is an annular member. Sliding member 32a is formed of, for example, a felt material. Sliding member 32a is provided on inner circumferential surface 30a of lens hood 30. More specifically, sliding member 32a is disposed at holding part 30b of inner circumferential surface 30a. One end of sliding member 32a is fixed to holding part 30b.

Sliding member 32b is an annular member. Sliding member 32b is formed of, for example, the felt material. Sliding member 32b is provided on outer circumferential surface 31b of filtering 31. More specifically, sliding member 32b is provided at holding part 31be of outer circumferential surface 31b. One end of sliding member 32b is fixed to holding part 31be.

2-5. Holding Structure of Lens Hood

As shown in FIG. 5, lens hood 30 is attached to the tip of one-group unit 11 on the subject side in the optical axis X direction via filtering 31.

Moreover, as shown in FIGS. 6 and 7, lens hood 30 is disposed so as to surround outer circumferential surface 31b of filtering 31 in a state where lens hood 30 can slide forward and backward in the optical axis X direction. As shown in FIG. 6, a position at which lens hood 30 is located closest to the image surface side in the optical axis X direction is the storage position. Further, as shown in FIG. 7, a position at which lens hood 30 is protruded to the subject side with respect to the storage position in the optical axis X direction is the use position. Lens hood 30 slides between the storage position shown in FIG. 6 and the use position shown in FIG. 7 along the optical axis X direction. In a case where lens hood 30 is located at the use position in FIG. 7, lens hood 30 prevents unnecessary light from entering the optical system (lenses L1 to L18) included in lens barrel 10.

More specifically, at the storage position shown in FIG. 6, an end on the subject side of lens hood 30 is located at approximately the same position as an end on the subject side of filtering 31. In other words, at the storage position shown in FIG. 6, lens hood 30 does not protrude from the end on the subject side of filtering 31 to the subject side in the optical axis X direction.

On the other hand, at the use position shown in FIG. 7, the end on the subject side of lens hood 30 moves to the subject side in the optical axis X direction with respect to the end on the subject side of filtering 31. In other words, at the use position shown in FIG. 7, lens hood 30 is protruded to the subject side in the optical axis X direction with respect to filtering 31.

With this configuration, at the use position shown in FIG. 7, lens hood 30 can suppress incidence of unnecessary light on lens L1 and the like held by one-group unit 11. In other words, cylindrical lens hood 30 protrudes to the subject side in the optical axis X direction and covers a space on the subject side of lens L1 held by one-group unit 11 from the side. With this configuration, lens hood 30 can suppress incidence of unnecessary light on the optical system, such as lens L1.

Lens hood 30 moves forward and backward in the optical axis X direction in a state where annular sliding member (sliding member according to the present disclosure) 32a provided on inner circumferential surface 30a abuts on outer circumferential surface 31b of filtering 31. In other words, sliding member 32a moves forward and backward in the optical axis X direction together with lens hood 30 in a state where sliding member 32a abuts on outer circumferential surface 31b (inclined surface 31ba or the like) of filtering 31. Further, when a lens hood 30 side moves forward and backward in the optical axis X direction, sliding member 32b abuts on inner circumferential surface 30a of lens hood 30. With this configuration, lens hood 30 can be quietly slid in the optical axis X direction.

A structure in which lens hood 30 is held by filtering 31 at each of the storage position and the use position will be described below.

FIG. 8A shows the structure of lens hood 30 and filtering 31 at the storage position. The one end of sliding member 32a is fixed to holding part 30b of lens hood 30. The other end of sliding member 32a is held in a state where the other end is fitted into a recessed portion of first holding part 31bb of filtering 31.

On the other hand, the one end of sliding member 32b is fixed to holding part 31be of filtering 31, as described above.

Clearance S1 is a cylindrical space formed between inner circumferential surface 30a of lens hood 30 and outer circumferential surface 31b of filtering 31. Also, clearance S1 is formed in a state where lens hood 30 is located at the storage position.

Here, description is given of an interval between inner circumferential surface 30a of lens hood 30 and outer circumferential surface 31b of filtering 31 in the state where lens hood 30 is located at the storage position. The interval indicates a shortest distance in a direction perpendicular to the optical axis X direction.

An interval between inner circumferential surface 30a of lens hood 30 at a portion where sliding member 32a is located and outer circumferential surface 31b of filtering 31 is interval H1. In other words, interval H1 is an interval between holding part 30b and first holding part 31bb. Further, an interval between inner circumferential surface 30a and outer circumferential surface 31b at a portion where protrusion surface 31bc is located is interval H2. A relationship between interval H1 and interval H2 satisfies the following relational expression (1).

$$H1 > H2 \quad (1)$$

In other words, as shown in FIG. 8A, a portion of clearance S1 is formed so that the clearance becomes smaller toward the subject side in the optical axis X direction by inclined surface 31ba formed on outer circumferential surface 31b of filtering 31.

Moreover, an interval between inner circumferential surface 30a of lens hood 30 and a portion where second holding part 31bd is located is interval H3. A relationship between interval H1 and interval I13 satisfies the following relational expression (2).

$$H1 \approx H3 \quad (2)$$

In other words, interval H1 and interval I13 have approximately the same size.

Here, lens hood 30 is slid from the storage position shown in FIG. 8A to the use position shown in FIG. 8B.

First, with the movement of lens hood 30, sliding member 32a moves from the position at which the interval between lens hood 30 and filtering 31 is interval H1 to the position of interval I12 which is narrower than interval H1. At this time, sliding member 32a moves while abutting on outer circumferential surface 31b of filtering 31. Further, sliding member 32a receives force compressing in a radial direction of sliding member 32a, and moves while being deformed.

Also, when lens hood 30 is further moved to the subject side, sliding member 32a is fitted into second holding part 31bd by riding over protrusion surface 31bc. In other words, lens hood 30 moves to the use position shown in FIG. 8B, and sliding member 32a is held in a state where sliding member 32a is fitted into the recessed portion of second holding part 31bd.

With this configuration, lens hood 30 is held at the use position shown in FIG. 8B. Further, since interval I13 is larger than interval I12, a user can recognize that lens hood 30 has moved to the use position with operational feeling.

Moreover, sliding member 32a is held in the clearance of interval H1 at the storage position shown in FIG. 8A and the clearance of interval H3 at the use position shown in FIG. 8B, wherein intervals H1 and H3 have approximately the same size. Accordingly, sliding member 32a can hold lens hood 30 without receiving large compressive force at the storage position shown in FIG. 8A and the use position shown in FIG. 8B.

In the present exemplary embodiment, in a case where lens hood 30 is located at the use position shown in FIG. 8B, sliding member 32a and protrusion 131bd constituting second holding part 31bd make contact with each other. Also, protrusion 130b constituting holding part 30b of lens hood 30 and protrusion 131bd of filtering 31 do not make contact with each other. With this configuration, it is possible to reduce operation sound generated when lens hood 30 is moved to the use position.

Note that, when lens hood 30 slides forward and backward in the optical axis X direction, sliding member 32b held by holding part 31be supports lens hood 30 from an inner circumferential surface 30a side in a state where sliding member 32b abuts on inner circumferential surface 30a of lens hood 30.

3. Effects and the Like

A comparative example includes a structure in which a lens hood is held by a guide groove provided at the lens hood and an elastic protrusion provided at a ring. However, when a user photographs with a camera, there may be a case where the user photographs while moving. In this case, lens barrel 10 may be hit against a surrounding object. Further, when the user carries the camera, there may be a case where the user drops the camera. With this configuration, lens barrel 10 may receive impacts in various directions, such as an optical axis X direction or a rotation direction with the optical axis X direction as a rotation axis. In such a case, in the configuration in the comparative example, there is a problem in that a load is concentrated on the guide groove or the elastic protrusion. In other words, there may be a case where strength against the impacts of the lens barrel or the camera in the comparative example is lowered.

On the other hand, in the present exemplary embodiment, sliding member 32a is provided on inner circumferential surface 30a side of lens hood 30. When lens hood 30 moves from the storage position to the use position, sliding member 32a moves to the subject side in the optical axis X direction in the state where sliding member 32a is in contact with outer circumferential surface 31b of filtering 31. Moreover, in the present exemplary embodiment, in at least the portion of clearance S1, the interval between inner circumferential surface 30a of lens hood 30 and outer circumferential surface 31b of filtering 31 is narrowed toward the subject side in the optical axis X direction in the state where lens hood 30 is located at the storage position. In other words, in the present exemplary embodiment, lens hood 30 is held by filtering 31 by compressing sliding member 32a in the radial direction of sliding member 32a at clearance S1. With this configuration, for example, even when the impact in the optical axis X direction or the impact in the rotation direction with the optical axis X direction as the rotation axis is applied, stress loading can be dispersed by whole sliding member 32a. As a result, strength of lens barrel 10 can be improved. Further, the guide groove may not be provided, and manufacturing cost can be reduced. Further, the elastic protrusion may not be provided, and a number of parts can be reduced.

Moreover, in the present exemplary embodiment, inclined surface 31ba is provided. With this configuration, the interval of clearance S1 can be gradually narrowed from the image surface side to the subject side in the optical axis X direction.

Moreover, in the present exemplary embodiment, second holding part 31bd serving as the recess is formed on outer circumferential surface 31b of filtering 31. Sliding member 32a is fitted into second holding part 31bd in the state where lens hood 30 is located at the use position. With this configuration, in the present exemplary embodiment, a position of sliding member 32a at the use position is stabilized.

Moreover, in the present exemplary embodiment, interval H1 and interval H3 have approximately the same size. With this configuration, in the present exemplary embodiment, the compressive force received by sliding member 32a can be reduced in both the cases where lens hood 30 is located at the storage position and where lens hood 30 is located at the use position. This can suppress time degradation of sliding member 32a.

Further, interval H3 is larger than interval 112. Therefore, when the lens hood 30 is moved from the storage position to the use position, a user can recognize that lens hood 30 has reached the use position with operational feeling.

Further, in the present exemplary embodiment, the felt material is used as the material of sliding member 32a and sliding member 32b. Here, the felt material is excellent in wear resistance, durability, shock resistance, and the like. Accordingly, even in a case where lens hood 30 is repeatedly slid between the storage position and the use position, wear, deformation, breakage, or the like of sliding member 32a and sliding member 32b can be suppressed.

Moreover, since the felt material is used as the material of sliding member 32a and sliding member 32b, a silencing effect which suppresses the operation sound generated when lens hood 30 is slid between the storage position and the use position can be obtained. Hence, even in a case where metallic lens hood 30 is slid on the outer circumferential surface side of similarly metallic filtering 31, the operation sound caused by the contact between the metallic parts can be reduced.

Here, in a case where an animal, such as an insect or a bird, is a subject, the subject may run away even by a small operation sound. By reducing the operation sound, it is easier to photograph various subjects.

Further, in the present exemplary embodiment, lens hood 30 can be held by the two members, i.e., sliding member 32a and sliding member 32b. Therefore, looseness of lens hood 30 can be suppressed, and lens hood 30 can be stably held by filtering 31.

4. Other Exemplary Embodiments

The one exemplary embodiment of the present disclosure has been described above. However, the present disclosure is not limited to the above-described exemplary embodiment, and various changes can be made without deviating from the scope of the present disclosure.

(A)

In the above-described exemplary embodiment, an example is given in which lens hood 30 is slid relative to filtering 31 in the state where sliding member 32a and sliding member 32b formed of the felt material are disposed between inner circumferential surface 30a of lens hood 30 and outer circumferential surface 31b of filtering 31. However, the present disclosure is not limited to this example.

Figure 9:
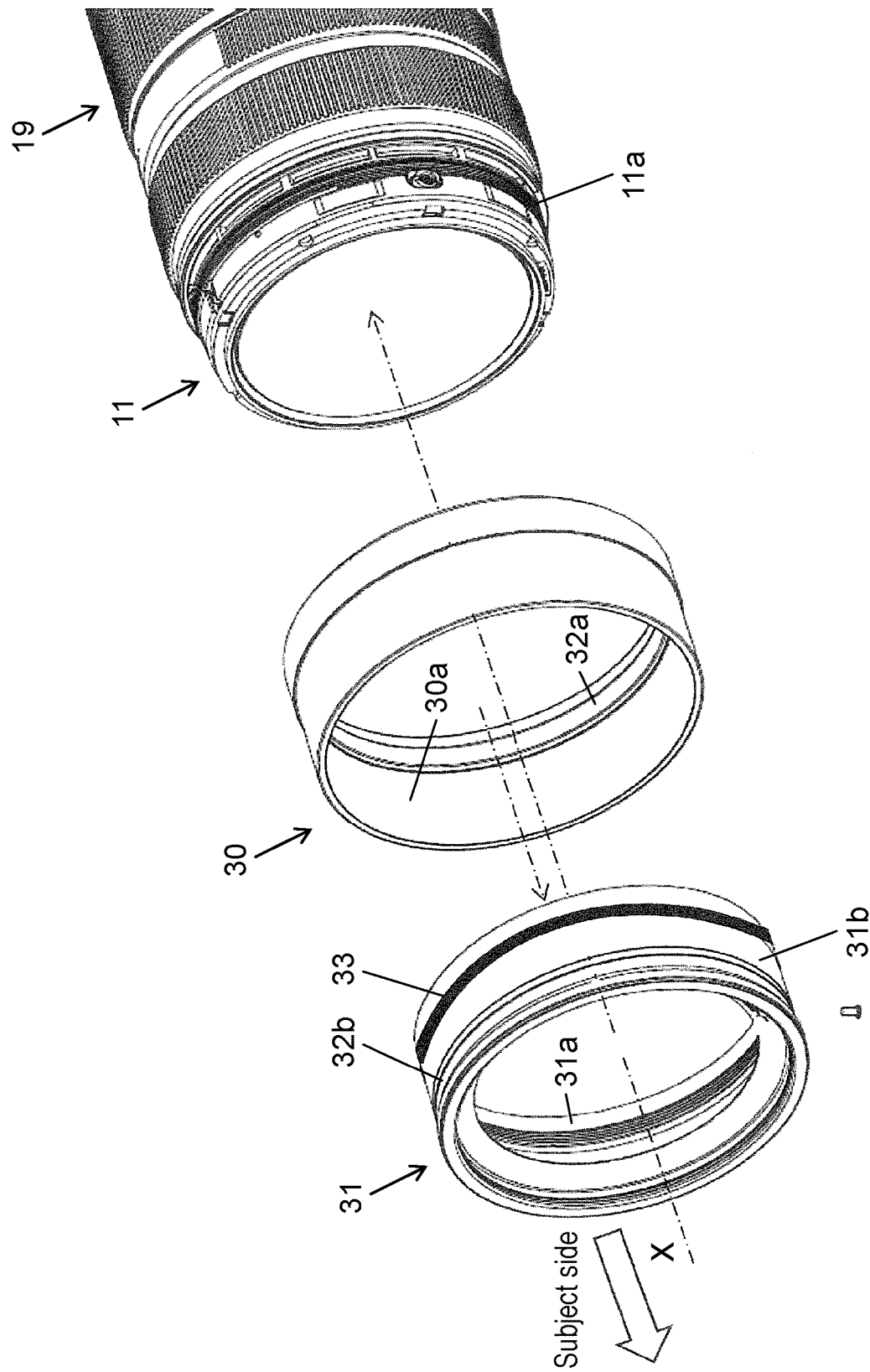
FIG. 9 is an exploded perspective view showing a configuration of a lens barrel provided with a holding structure of a lens hood according to another exemplary embodiment of the present disclosure.

For example, as shown in FIG. 9, lens barrel 10 may have a configuration in which rubber ring 33 is disposed at a position of outer circumferential surface 31b of filtering 31 closer to an opposite side to a subject. A silencing effect during the movement of lens hood 30 can be further enhanced by rubber ring 33.

(B)

In the above-described exemplary embodiment, an example is given in which two annular sliding member 32a and sliding member 32b are disposed between inner circumferential surface 30a of lens hood 30 and outer circumferential surface 31b of filtering 31. However, the present disclosure is not limited to this example.

For example, a number of sliding members provided between inner circumferential surface 30a of lens hood 30 and outer circumferential surface 31b of filtering 31 may be one or may be three or more.

In a case where the number of sliding members is one, it is preferable to use only sliding member 32a in the above-described exemplary embodiment.

(C)

In the above-described exemplary embodiment, an example is given in which sliding member 32a and sliding member 32b formed of the same felt material are disposed between inner circumferential surface 30a of lens hood 30 and outer circumferential surface 31b of filtering 31. However, the present disclosure is not limited to this example.

For example, the two sliding members may be formed of different materials. A material other than the felt material includes a rubber, a sponge, and the like applied with coating for smooth sliding.

(D)

In the above-described exemplary embodiment, an example is given in which two annular sliding member 32a and sliding member 32b are disposed between inner circumferential surface 30a of lens hood 30 and outer circumferential surface 31b of filtering 31. However, the present disclosure is not limited to this example.

For example, the shape of sliding member 32a and sliding member 32b are not limited to an annular shape. A structure of sliding member 32a and sliding member 32b may be a structure formed by combining a plurality of arc-shaped members.

(E)

In the above-described exemplary embodiment, an example is given in which clearance S1 which satisfies the conditional expression (1) and the conditional expression (2) is configured with irregularities including inclined surface 31ba provided on an outer circumferential surface 31b side of filtering 31. However, the present disclosure is not limited to this example.

For example, clearance S1 which satisfies the conditional expression (1) and the conditional expression (2) may be configured by providing irregularities on inner circumferential surface 30a of lens hood 30 facing outer circumferential surface 31b of filtering 31.

Alternatively, clearance S1 which satisfies the conditional expression (1) and the conditional expression (2) may be configured with irregularities provided both on inner circumferential surface 30*a* of lens hood 30 and outer circumferential surface 31*b* of filtering 31.

(F)

Figure 10:
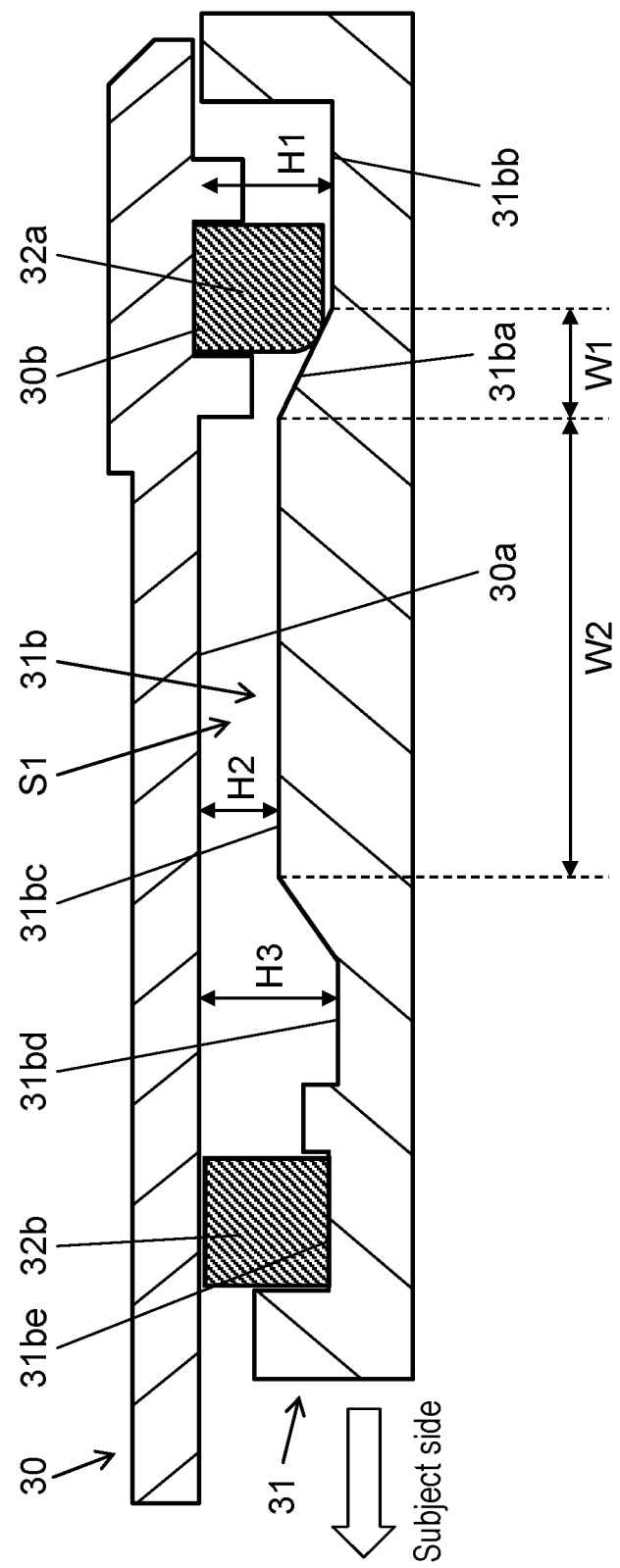
FIG. 10 is a sectional view schematically showing a position of a sliding member in a state where a lens hood attached to a tip of a lens barrel according to another exemplary embodiment of the present disclosure is located at a storage position.

Moreover, as another exemplary embodiment, FIG. 10 shows a configuration in which sliding member 32*a* makes contact with inclined surface 31*ba* in a state where lens hood 30 is located at a storage position. A portion of sliding member 32*a* makes contact with inclined surface 31*ba* in this way, thereby suppressing looseness of lens hood 30 at the storage position. By suppressing the looseness, mechanical degradation of lens hood 30 or filtering 31 is suppressed, and a silencing effect can be obtained.

Here, in the embodiment shown in FIG. 10, a width of inclined surface 31*ba* in an optical axis X direction is represented by width W1. Further, a width of outer circumferential surface 31*b* of a region constituting protrusion surface 31*bc* in the optical axis X direction is represented by width W2. It is preferable that width W1 and width W2 satisfy the following conditional expression (3).

$$W1<W2 \quad (3)$$

In other words, width W1 is smaller than width W2, and an angle of inclined surface 31*ba* relative to the optical axis X direction is made large. With this configuration, appropriate compressive force can be applied to sliding member 32*a*. As a result, lens hood 30 is stably held.

(G)

The tip member of the present disclosure includes filtering 31 and one-group unit 11. In the present exemplary embodiment, filtering 31 and one-group unit 11 are respectively separable. However, as described above, filtering 31 and one-group unit 11 may be integrally formed.

A lens barrel of the present disclosure can reduce a load in a strength aspect. Therefore, the lens barrel is widely applicable to a lens barrel in which a lens hood is attached to a tip on a subject side in an extendible state.

What is claimed is:

1. A lens barrel comprising:
    a tip member disposed on a subject side in an optical axis direction and including an optical system;
    a lens hood mounted on the tip member and moving in the optical axis direction between a predetermined storage position and a use position protruded to the subject side with respect to the storage position, wherein a clearance is formed between an inner circumferential surface of the lens hood and an outer circumferential surface of the tip member; and
    a sliding member provided on the inner circumferential surface side of the lens hood, and when the lens hood moves from the storage position to the use position, the sliding member and a portion of the clearance moving relative to one another in the optical axis direction in a state where the sliding member is in contact with the outer circumferential surface of the tip member,
    wherein in a state where the lens hood is located at the storage position, an interval of at least the portion of the clearance formed between the inner circumferential surface of the lens hood and the outer circumferential surface of the tip member is narrowed in the optical axis direction,
    when the lens hood moves the sliding member moves in the portion of the clearance while being deformed,
    a shape of the sliding member is either of an annular shape or an arc-shape, and a central axis of the shape is coaxial with the optical axis, and
    when the lens hood is located at the storage position, the lens hood is rotatable about the optical axis relative to the tip member while remaining in the storage position.

2. The lens barrel according to claim 1, wherein
    the outer circumferential surface of the tip member has an inclined surface disposed obliquely to the optical axis direction, and
    the portion of the clearance is formed between the inner circumferential surface of the lens hood and the inclined surface.

3. The lens barrel according to claim 1, wherein a recess in which the sliding member is disposed in a state where the lens hood is located at the use position is formed on the outer circumferential surface of the tip member.

4. The lens barrel according to claim 3, wherein
    in the state where the lens hood is located at the storage position,
    an interval between the inner circumferential surface of the lens hood and a surface of the recess facing the inner circumferential surface has a size approximately equivalent to an interval between the inner circumferential surface of the lens hood provided with the sliding member and the outer circumferential surface of the tip member.

5. The lens barrel according to claim 1, wherein the sliding member is formed of a felt material.

6. The lens barrel according to claim 2, wherein the sliding member is in contact with the inclined surface in the state where the lens hood is located at the storage position.

7. A camera comprising:
    the lens barrel of claim 1; and
    a camera body to which the lens barrel is attached.

8. The lens barrel according to claim 1, wherein one end of the sliding member is fixed to the inner circumferential surface of the lens hood.

9. The lens barrel according to claim 1, wherein the tip member is configured to be separated into a first part in the subject side and a second part in an imaging surface side.

10. The lens barrel according to claim 1, wherein a protrusion which protuberates directing to the lens hood is arranged on an outer circumferential surface of a part of the tip member.

11. The lens barrel according to claim 1, wherein
    the sliding member is formed of at least one of a felt material, rubber, and sponge.

12. The lens barrel according to claim 1, wherein
    the sliding member is a first sliding member; and
    the lens barrel further comprises:
        a second sliding member provided on the inner circumferential surface side of the lens hood, and
    the first sliding member and the second sliding member are each annular and aligned in the optical axis direction.

13. The lens barrel according to claim 12, wherein
    the first sliding member is arranged in an imaging surface side, and the second sliding member is arranged in the subject side,
    one end of the first sliding member is fixed to the inner circumferential surface of the lens hood, and
    one end of the second sliding member is fixed to the outer circumferential surface of the tip member.

14. A lens barrel comprising:
    a tip member disposed on a subject side in an optical axis direction and including an optical system;

a lens hood mounted on the tip member and moving in the optical axis direction between a predetermined storage position and a use position protruded to the subject side with respect to the storage position, wherein a clearance is formed between an inner circumferential surface of the lens hood and an outer circumferential surface of the tip member; and a sliding member provided on the inner circumferential surface side of the lens hood, and when the lens hood moves from the storage position to the use position, the sliding member and a portion of the clearance moving relative to one another in the optical axis direction in a state where the sliding member is in contact with the outer circumferential surface of the tip member, wherein in a state where the lens hood is located at the storage position, an interval of at least the portion of the clearance formed between the inner circumferential surface of the lens hood and the outer circumferential surface of the tip member is narrowed in the optical axis direction, and an interval of another portion of the clearance is widened in the optical axis direction, when the lens hood moves, the sliding member and the portion of the clearance move relative to one another such that when the lens hood is located between the storage position and the use position and moves toward the use position, the sliding member slides in the portion of the clearance while being deformed against the outer circumferential surface of the tip member, and such that when the sliding member is located in the another portion of the clearance and the lens hood moves toward the use position, the sliding member moves in the another portion of the clearance while expanding on the outer circumferential surface of the tip member, and a shape of the sliding member is either of an annular shape or an arc-shape, and a central axis of the shape is coaxial with the optical axis.

15. A lens barrel comprising:

a tip member disposed on a subject side in an optical axis direction and including an optical system;

a lens hood mounted on the tip member and moving in the optical axis direction between a predetermined storage position and a use position protruded to the subject side with respect to the storage position, wherein a clearance is formed between an inner circumferential surface of the lens hood and an outer circumferential surface of the tip member; and a sliding member provided on the inner circumferential surface side of the lens hood, and when the lens hood moves from the storage position to the use position, the sliding member and a portion of the clearance moving relative to one another in the optical axis direction in a state where the sliding member is in contact with the outer circumferential surface of the tip member, wherein in a state where the lens hood is located at the storage position, an interval of at least the portion of the clearance formed between the inner circumferential surface of the lens hood and the outer circumferential surface of the tip member is narrowed in the optical axis direction, when the lens hood moves the sliding member and the portion of the clearance move relative to one another such that when the lens hood is located between the storage position and the use position and moves toward the use position, the sliding member moves in the portion of the clearance while being gradually and increasingly deformed against the outer circumferential surface of the tip member, and a shape of the sliding member is either of an annular shape or an arc-shape, and a central axis of the shape is coaxial with the optical axis.

16. The lens barrel according to claim 1, wherein when the lens hood is located in the use position the entire lens hood is radially spaced from the tip member.

* * * * *